(12) United States Patent
Nishimoto et al.

(10) Patent No.: US 6,750,560 B1
(45) Date of Patent: Jun. 15, 2004

(54) ELECTROMAGNETICALLY COUPLED DEVICE

(75) Inventors: Ikuo Nishimoto, Tokyo (JP); Tatsuya Ueno, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/332,926

(22) PCT Filed: Jul. 14, 2000

(86) PCT No.: PCT/JP00/04742

§ 371 (c)(1),
(2), (4) Date: Jan. 13, 2003

(87) PCT Pub. No.: WO02/07173

PCT Pub. Date: Jan. 24, 2002

(51) Int. Cl.$^7$ .................................................. H02J 1/00
(52) U.S. Cl. ....................................... 307/1; 340/310.07
(58) Field of Search .................. 363/147; 343/720; 340/333, 425.1, 425.2, 310.01, 310.08, 310.07; 307/1, 3, 104; 455/270, 402, 41.1; 361/18; 327/309

(56) References Cited

U.S. PATENT DOCUMENTS 6,005,304 A * 12/1999 Seelig .......................... 307/104
6,546,268 B1 * 4/2003 Ishikawa et al. ............ 600/345
6,649,985 B1 * 11/2003 Nishimoto et al. .......... 257/401

FOREIGN PATENT DOCUMENTS

JP          7-106170 A          4/1995

* cited by examiner

*Primary Examiner*—Shawn Riley
(74) *Attorney, Agent, or Firm*—Frishauf, Holtz, Goodman & Chick, P.C.

(57) ABSTRACT

A device includes a coil (11) coupled to a magnetic field having power energy by electromagnetic induction, a rectifier (12) for subjecting the power energy fetched by the coil to full-wave rectification, a smoothing circuit (13) for smoothing a rectified output from the rectifier and forming a fixed internal power source, an MOS transistor (14) having a source and a drain connected in parallel across the coil, and a constant-voltage control circuit (15) adapted to be actuated to control the gate voltage of the MOS transistor in response to the output of the smoothing circuit, thereby limiting voltage (power) applied to the rectifier. The device further includes a data reception unit (21) for detecting a modulated component of the power energy fetched by means of the coil and receiving an information signal represented by the modulated, component and a data transmission unit (24) for controlling the gate voltage of the MOS transistor in response to transmission information, changing the extent of electromagnetic-induction coupling to the magnetic field of the coil, and transmitting the transmission information.

5 Claims, 4 Drawing Sheets

ELECTROMAGNETICALLY COUPLED DEVICE

This application is a U.S. National Phase Application under 35 USC 371 of International Application PCT/JP00/04742 filed Jul. 14, 2000.

TECHNICAL FIELD

The present invention relates to an electromagnetic-induction coupling device capable of forming a stable internal power source from power energy supplied from an external apparatus by electromagnetic-induction coupling by means of a coil and/or capable of stable information communication with the external apparatus through the coil.

BACKGROUND ART

A ball semiconductor has recently been proposed in which function elements, such as transistors, sensors, etc. and a semiconductor integrated circuit that has given processing functions are formed on the surface of a ball semiconductor chip with a diameter of about 1 mm. Some ball semiconductors of this type are provided with a coil (loop antenna) 2 that is formed on the surface of a ball semiconductor chip 1 and serves as an antenna element, as shown in FIG. 4, for example. These ball semiconductors are constructed so that they are actuated with power supplied from an external apparatus by utilizing electromagnetic-induction coupling by means of the coil 2, and transmit to and receive information signals from the external apparatus through the coil.

The integrated circuit formed on the semiconductor chip 1 comprises a power source unit 3, a reception unit 4, and a transmission unit 5, as shown in FIG. 5, for example. The power source unit 3 receives power (electromagnetic energy) externally supplied through the coil 2 and forms a fixed internal power source. The reception unit 4 receives the information signals from the external apparatus through the coil 2. The transmission unit 5 transmits the information signals to the external apparatus through the coil 2. Further, the integrated circuit comprises a device body 6, which is formed of an arithmetic and control element or the like, a sensor element 7 such as a temperature sensing element, a memory 8, etc., and is constructed so as to fulfill its given function as the device body 6 is actuated.

The information signals are transmitted and received through the coil 2 in a manner such that the information signals are modulated with use of an electromagnetic-induction magnetic field for power transmission as a carrier.

As shown in FIG. 6, for example, the power source unit 3 comprises a rectifier 3a that subjects power energy supplied through the coil 2 to full-wave rectification. In general, the rectifier 3a is constructed so that MOS transistors formed on the semiconductor chip 1 are bridge-connected. The power energy supplied through the coil 2 considerably changes depending on the distance from the external apparatus as a source of the energy, and is substantially in inverse proportion to the square of the distance. In a power supply system constructed so that necessary electromagnetic energy can be supplied to the ball semiconductor at a maximum distance Lmax, therefore, power that is four times as high as the power required by the ball semiconductor can be supplied if the distance between the ball semiconductor and the external apparatus is halved. In consequence, voltage (full-wave rectified output) that is obtained through the rectifier 3a has a quadruple voltage value if the internal impedance of the power source unit 3 is fixed.

Conventionally, therefore, the full-wave rectified output of the rectifier 3a is solely adjusted to a fixed voltage (Zener breakdown voltage) by using the Zener diode 3b, as shown in FIG. 6, and the full-wave rectified output is smoothed by means of a capacitor 3c to form a stable internal power source.

Although the internal voltage is regulated by means of the Zener diode 3b, however, the power energy supplied through the coil 2 inevitably considerably changes depending on the distance from the external apparatus. Accordingly, the MOS transistors that constitute the rectifier 3a must be ones having power capacity that ensures an allowance for the maximum power energy. Inevitably, therefore, the MOS transistors are increased in size (or increased in area). In the case where the information signals are modulated and transmitted or received with use of electromagnetic waves of a given frequency coupled to, for example, the coil 2 by electromagnetic induction as carriers, the regulation of the voltage by means of the Zener diode 3b may possibly ruin the resulting modulated components, depending on the extent of modulation.

DISCLOSURE OF THE INVENTION

The present invention has been contrived in consideration of these circumstances, and its object is to provide an electromagnetic-induction coupling device furnished with a power source circuit having a simple construction and capable of forming an internal power source from power energy supplied from an external apparatus by utilizing electromagnetic-induction coupling by means of a coil.

Another object of the present invention is to provide an electromagnetic-induction coupling device capable of realizing secure information communication such that its internal power source is formed steadily without regard to the change of power energy supplied from an external apparatus by utilizing electromagnetic-induction coupling by means of a coil in modulating information signals with use of the power energy as a carrier and transmitting and receiving the information signals.

In order to achieve the above objects, an electromagnetic-induction coupling device according to the present invention comprises a coil coupled to a magnetic field having power energy by electromagnetic induction, a rectifier for subjecting the power energy fetched by means of the coil to full-wave rectification, and a smoothing circuit for smoothing a rectified output from the rectifier and forming an internal power source. The device is particularly characterized by comprising an MOS transistor having a source and a drain individually connected across the coil and a constant-voltage control circuit capable of controlling the gate voltage of the MOS transistor in response to the output of the smoothing circuit, thereby limiting voltage (AC voltage) applied to the rectifier so that a rectified output voltage (DC voltage) obtained by means of the rectifier is fixed.

Thus, in the electromagnetic-induction coupling device according to the present invention, the MOS transistor is provided in parallel with the coil for fetching the power energy by electromagnetic-induction coupling, and the power energy is partially bypassed by means of the MOS transistor. The fixed DC voltage (internal power source) is obtained by thus limiting the power energy applied to the rectifier and the resulting AC voltage. If the gate voltage of the MOS transistor is controlled in accordance with the signal power source (DC voltage) that is obtained by smoothing the full-wave rectified output from the rectifier, in particular, some of the power energy can be alternatively bypassed in a manner such that the respective functions of the source and drain of the MOS transistor are changed depending on the polarity of the power energy (AC) obtained from the coil with respect to the gate voltage. In consequence, the power energy (AC) applied to the rectifier can be limited itself, so that the power capacity of a rectifier element (MOS transistor) that constitutes the rectifier can be reduced to match the power capacity required by its internal circuit, whereby the rectifier element (MOS transistor) can be downsized.

Further, an electromagnetic-induction coupling device according to the present invention comprises a data reception unit for detecting a modulated component of the power energy fetched by means of the coil and receiving an information signal represented by the modulated component and a data transmission unit for controlling the gate voltage of the MOS transistor in response to transmission information, changing the extent of electromagnetic-induction coupling to the magnetic field of the coil, and transmitting the transmission information.

In this electromagnetic-induction coupling device that further comprises the data reception unit and the data transmission unit, the MOS transistor is driven at the gate voltage that is generated in accordance with an internal voltage of which the high-frequency component is removed from the full-wave rectified output from the rectifier by means of the smoothing circuit. Accordingly, the power energy applied to the rectifier can be restrained without ruining the modulated component of the power energy obtained through the coil. In soothing the full-wave rectified output obtained from the rectifier to obtain the fixed internal voltage, therefore, the power energy applied to the rectifier is only limited by using the MOS transistor, as mentioned before. Thus, the modulated component that is obtained by modulating the information signal with use of the power energy fetched by means of the coil as the carrier can be detected securely.

Preferably, the rectifier is constructed by bridge-connecting four MOS transistors as rectifier elements and is integrated concurrently with the MOS transistors connected in parallel with the coil on a given semiconductor. The given semiconductor is realized as a ball semiconductor having the coil on its surface.

BEST MODE FOR CARRYING OUT THE INVENTION

An electromagnetic-induction coupling device according to one embodiment of the present invention will now be described with reference to the drawings. This electromagnetic-induction coupling device is realized as a ball semiconductor that is actuated when it is supplied with power energy by the use of electromagnetic waves from an external apparatus, for example, and is roughly constructed having a power source unit shown in FIG. 1.

Figure 1:
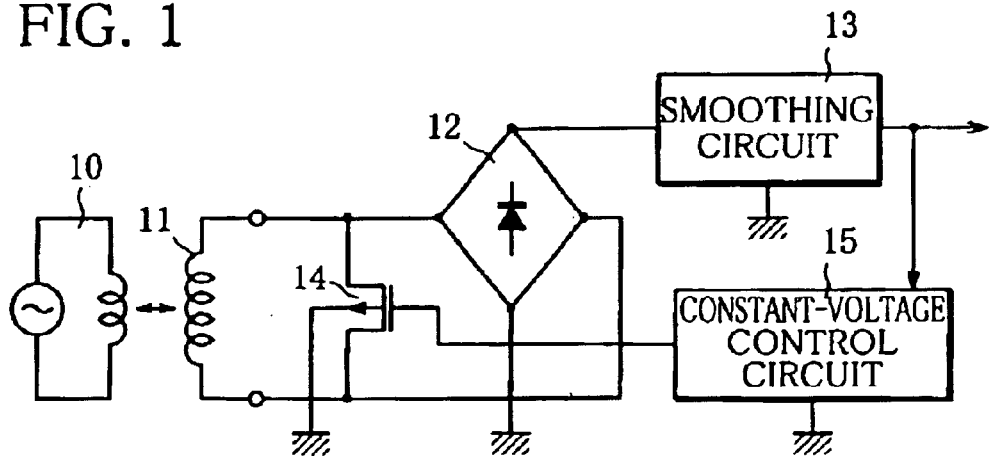
FIG. 1 is a diagram schematically showing the configuration of a power source unit of an electromagnetic-induction coupling device according to one embodiment of the present invention.

The power source unit shown in FIG. 1 is provided with a coil 11, which is situated in a magnetic field that an external apparatus 10 forms and coupled to this magnetic field by electromagnetic induction, and fetches power energy from the magnetic field. If the electromagnetic-induction coupling device is formed of a ball semiconductor, the coil 11 is formed of an annular coil with one or several turns, which in wound around the surface of a ball semiconductor substrate, for example, and serves as an antenna element.

A rectifier 12 for full-way rectification of power energy (AC) that is obtained from the aforesaid magnetic field through the coil 11 is provided between the opposite terminals of the coil 11. A full-wave rectified output from the rectifier 12 is smoothed by means of a smoothing circuit 13 that is formed of a capacitor or the like, and is supplied as a fixed internal power source (DC) to an internal circuit (not shown). The rectifier 12 is formed having the MOS transistors bridge-connected in the manner described before with reference to FIG. 6.

This power source unit is characterized in that a source and a drain are individually connected across the coil 11 on the side precedent to the rectifier 12 and that a MOS transistor 14 is connected in parallel with the coil 11. In order to drive the MOS transistor 14, moreover, a constant-voltage control circuit 15 is provided that generates a control voltage (DC voltage) corresponding to an internal voltage smoothed by means of the smoothing circuit 13 in response to the internal voltage. The control voltage that is generated by the constant-voltage control circuit 15 is applied to the gate of the MOS transistor 14.

Thus, in this power source unit, the MOS transistor 14 is driven in a manner such that a gate voltage corresponding to the internal power source formed by soothing the full-wave rectified output from the rectifier 12 is applied to the gate of the MOS transistor 14 that is connected in parallel with the AC input side of the rectifier 12. Electric power energy (AC) obtained through the coil 11 is partially bypassed by means of the MOS transistor 14. Thus, the internal power source (DC voltage) that is formed by means of the rectifier 12 is stabilized by limiting the power energy applied to the rectifier 12.

According to the power source unit constructed in this manner, the rectifier 12, smoothing circuit 13, and constant-voltage control circuit 15 that are integrated on the semiconductor substrate are normally constructed with the potential of the semiconductor substrate as a reference potential. On the other hand, both ends of the coil 11 itself are floating with respect to the potential (reference voltage) of the semiconductor substrate. As the coil 11 is connected to the rectifier 12, however, its terminal on the lower-voltage side is connected to the potential (reference voltage) of the semiconductor substrate, depending on the potential of the power energy (AC) that is generated in the coil 11.

On the other hand, the MOS transistor 14 that is connected in parallel with this coil 11 basically has an element construction such that its source and drain regions are arranged symmetrically with respect to a channel region that is formed under a gate electrode with an insulating layer between them. One of the two regions serves as the source region, and the other as the drain region, depending on the level of the potential applied to the regions. If the DC voltage (gate voltage) generated in the constant-voltage control circuit 15 is applied to the gate of the MOS transistor 14 that is of an n-channel type (n-MOS transistor), for example, that region of the n-MOS transistor 14 which is connected to the lower-potential-side terminal (terminal connected to the semiconductor substrate) of the coil 11 serves as a source region, depending on the polarity of the voltage generated in the coil 11. The n-MOS transistor 14 serves as a fixed resistor, operating in response to the gate voltage (DC voltage) that is applied between its gate and source, and partially bypasses the AC power energy (AC power) that is generated in the coil 11.

In consequence, the AC voltage that is applied to the rectifier 12, as well as the power energy applied to the rectifier 12, is restrained by the agency of the MOS transistor 14. Further, the voltage level of the full-wave rectified output obtained from the rectifier 12 is suppressed, and its smoothed output (internal source voltage) is stabilized at a fixed voltage level.

If the MOS transistor 14 is of a p-channel type (p-MOS transistor), that region which in connected to the higher-potential-side terminal of the coil 11 serves as a source, so that the transistor acts reversely to the aforesaid n-MOS transistor. Thus, the MOS transistor 14 functions fundamentally in the same manner with respect to the rectifier 12 by only Inverting the operating polarity without regard to its channel type, n- or p-.

According to the power source unit constructed so that the power energy applied to the rectifier 12 is limited by the use of the MOS transistor 14, a surplus of the power energy obtained through the coil 11 can be bypassed by means of the MOS transistor 14 if the power energy is higher than the power energy that is required by its internal circuit. Thus, the MOS transistor for use as a rectifier element that constitutes the rectifier 12 is expected only to have power capacity corresponding to the power energy required by the internal circuit, so that the MOS transistor can be downsized (or reduced in area). It is necessary only that the MOS transistor 14 have power capacity such that the surplus of the power energy obtained through the coil 11 can be bypassed.

Thus, the MOS transistor that constitutes the rectifier 12 should only be of a small size having an element area corresponding to the power capacity that is required by its internal circuit. On the other hand, the MOS transistor 14 should only be a large-sized one having large power capacity that ensures an allowance for surplus power supplied through the coil 11. It is necessary, therefore, only that only the MOS transistor 14 be a large-capacity one having a wide element area. Thus, the element formation scale (necessary area for element formation) of the entire power source unit can be lessened to downsize the unit.

The power source unit having the configuration described above is also available for use In the electromagnetic-induction coupling device that is constructed so that information signals are modulated for information communication with use of electromagnetic waves of a given frequency as carriers that supply power energy through the coil 11. Carrier signals of frequencies from hundreds of kHz to hundreds of MHz are used for transmitting power energy from the external apparatus to the ball semiconductor and superposing information signals for information communication. The information signals include command signals for actuating the ball semiconductor and error detection signs, for example, Further, the information signals that are transmitted from the ball semiconductor to the external apparatus include response signals for the command signals, measurement data obtained by means of the aforementioned sensor element 7 of the ball semiconductor, error detection signs, etc. ASK (amplitude shift keying), FSK (frequency shift keying), etc. may be suitably used as a modulation system for superposing these information signals on the aforementioned carrier signals.

Figure 2:
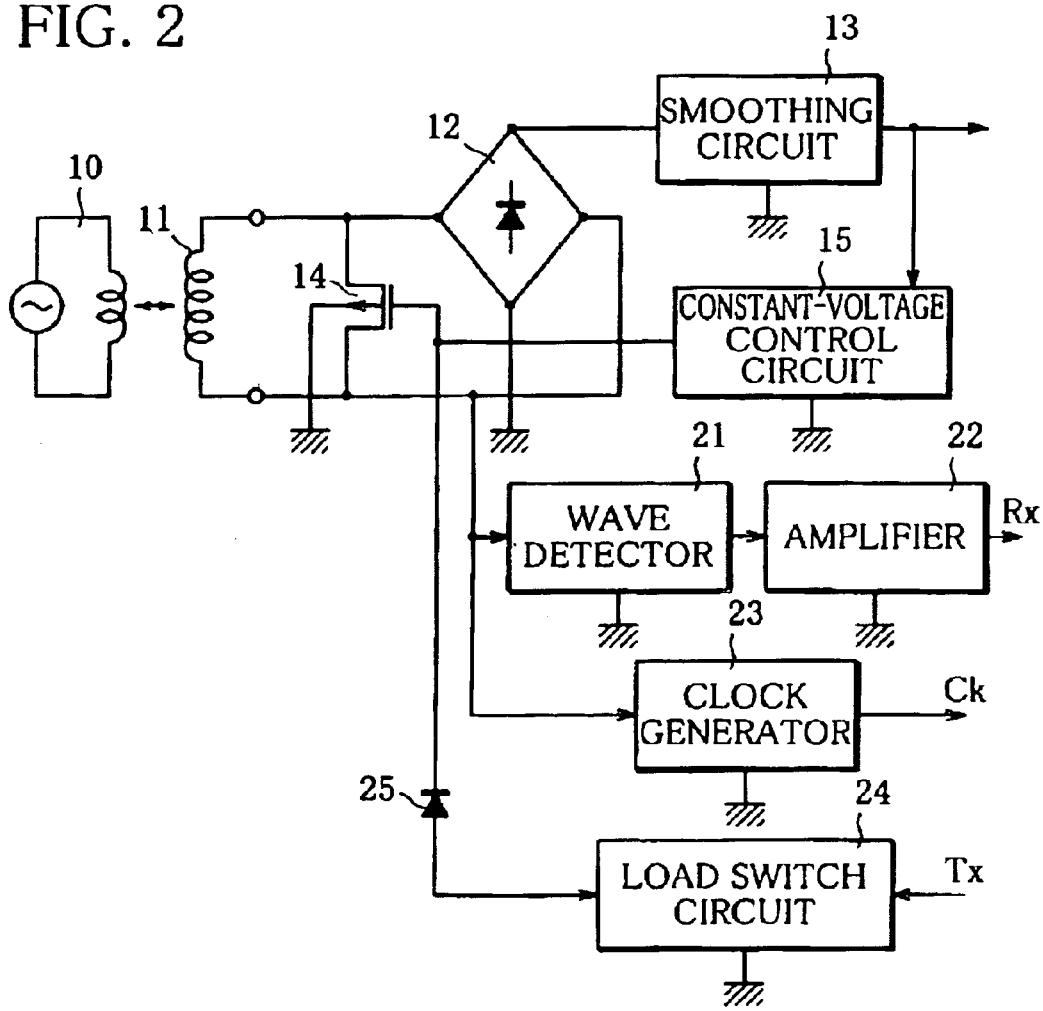
FIG. 2 is a diagram schematically showing an example of the configuration of a power source unit and a data communication unit of an electromagnetic-induction coupling device according to another embodiment of the present invention.

FIG. 2 shows an outline of an electromagnetic-induction coupling device that is provided with a data transmission function as well as the power source unit described above. Like numerals shown in FIG. 1 are used to designate like portions of the power source unit. A data reception unit for extracting the information signals superposed on the carriers of the power energy obtained through the coil 11 in formed of a wave detector 21 that is connected to one end of the coil 11. Its detection output is amplified to a given level by means of an amplifier 22, whereby demodulation data (reception data) is obtained. A clock generating element 23 is connected to the one end of the coil 11 and constructed so as to extract a carrier component obtained from the coil 11 and generate a clock signal of a given frequency from the frequency of this carrier component.

On the other hand, the data transmission unit is realized as a load switch circuit 24 that controls the gate voltage of the MOS transistor 14, changes the extent of electromagnetic-induction coupling (Q of coil 11) to the aforesaid magnetic field of the coil 11, and transmits the transmission information. The load switch circuit 24 is designed to control the gate voltage of the MOS transistor 14 by means of a diode 25, thereby functioning in parallel with the constant-voltage control circuit 15.

According to the electromagnetic-induction coupling device that is provided with the data reception unit (wave detector 21) and the data transmission unit (load switch circuit 24), stable data communication can be realized without regard to the magnitude of the power energy even when a fixed internal power source is formed for operation from the power energy that is obtained through the coil 11.

If the power energy obtained through the coil 11 is high, AC signals have an amplitude greater than that of the internal voltage, as shown in FIG. 3(a). In the illustrated example, the amplitude of the carrier signals is modulated at the rate of 10% by means of the information signals, and information "1" and information "0" are represented by amplitudes of 100% and 90%, respectively.

Figure 6:
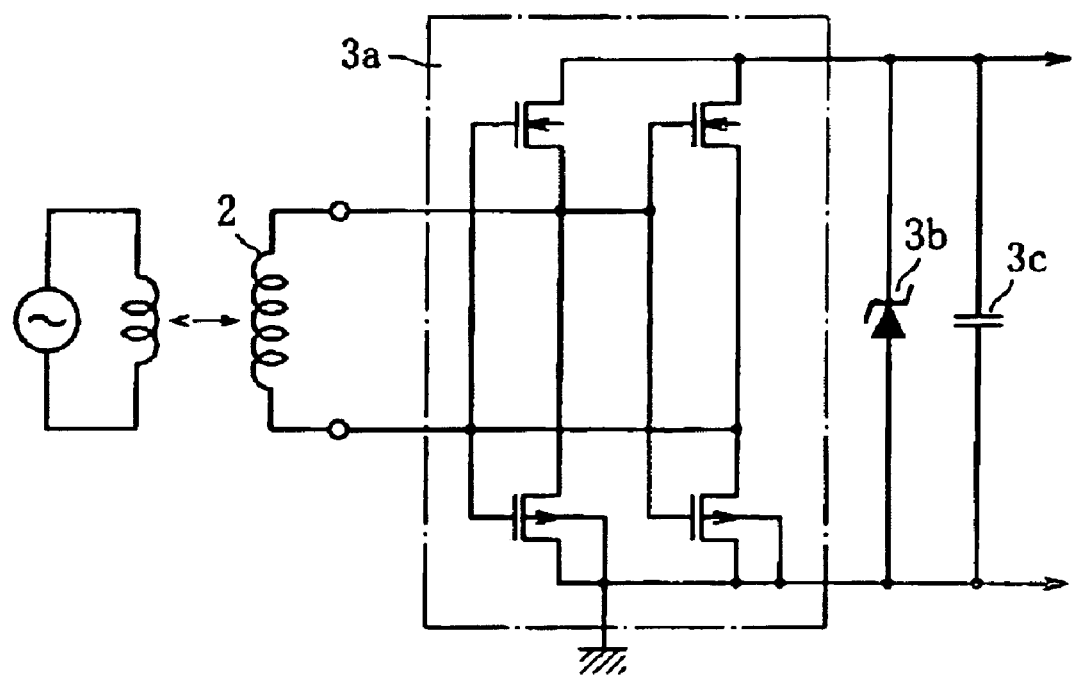
FIG. 6 is a diagram showing an example of the configuration of a power circuit attached to the ball semiconductor.

The 10%-modulated electromagnetic waves (power energy) are received by means of the coil 11, and the internal power source is formed using the conventional power source unit shown in FIG. 6, for example. Thereupon, a rectifier 3a subjects the power energy (AC power) directly to full-wave rectification, and the upper limit value of the rectified output voltage is determined by a Zener diode 3b, so that modulated components are canceled, as shown in FIG. 3(b). In other words, the rectified output voltage is determined by the Zener diode 3b that determines the voltage of the internal power source, so that the modulated components of the carrier signals are ruined, as indicated by the rectified equivalent waveform of FIG. 3(b).

Figure 3:
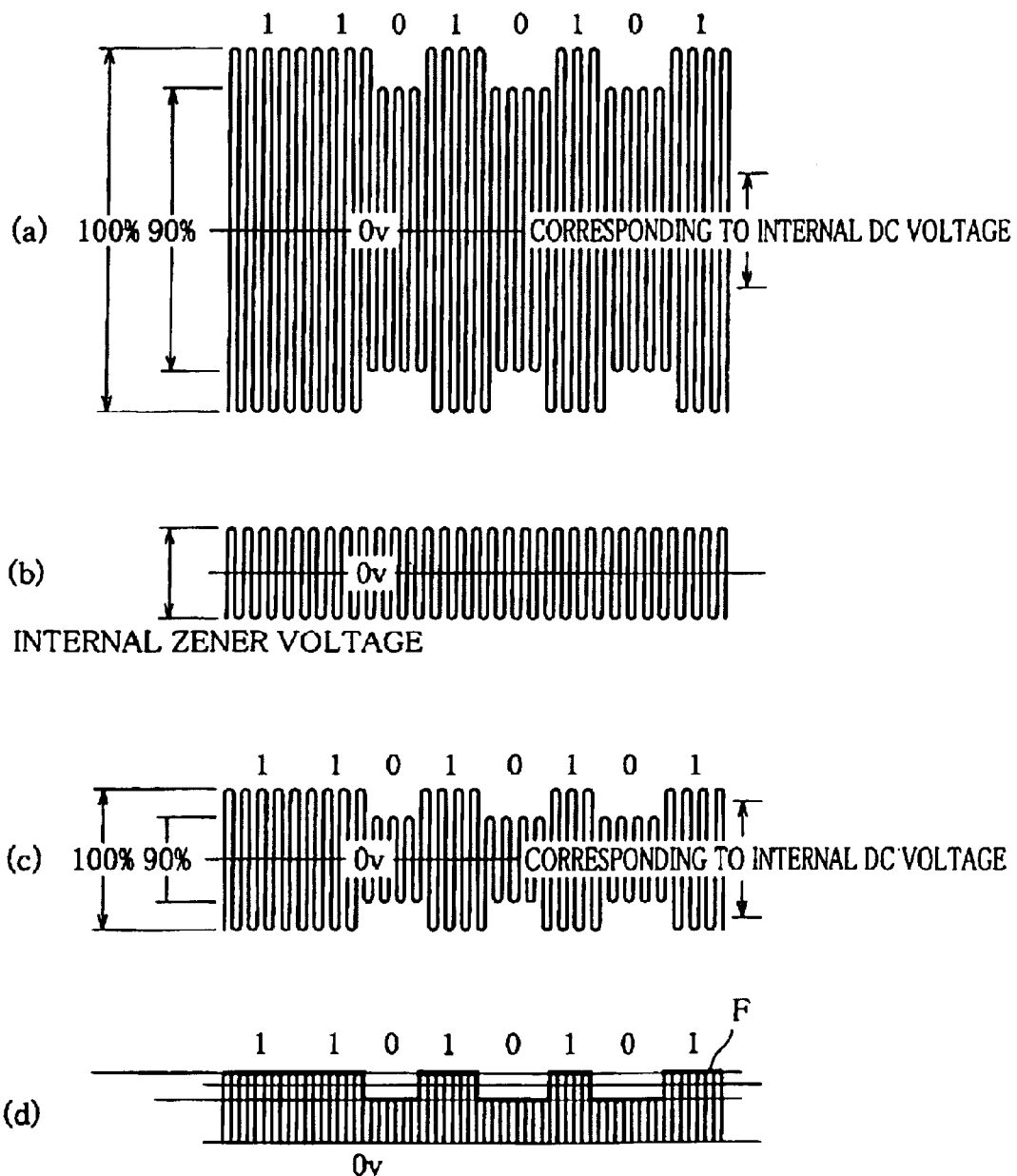
FIG. 3 is a voltage waveform diagram for illustrating the operation of the electromagnetic-induction coupling device according to the present invention, in which (a) shows an output voltage waveform of a coil, (b) shows a voltage waveform obtained when the output voltage of a rectifier is regulated by means of a Zener diode, (c) shows a voltage waveform applied to the rectifier in the electromagnetic-induction coupling device according to the present invention, and (d) shows a voltage waveform obtained from the rectifier in the electromagnetic-induction coupling device according to the present invention.
Figure 4:
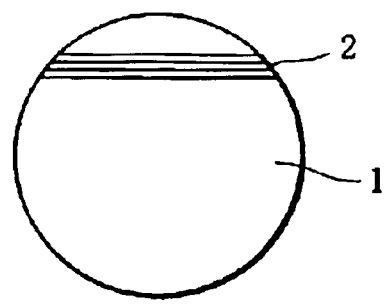
FIG. 4 is a diagram showing the relation between a ball semiconductor and the coil on its surface.
Figure 5:
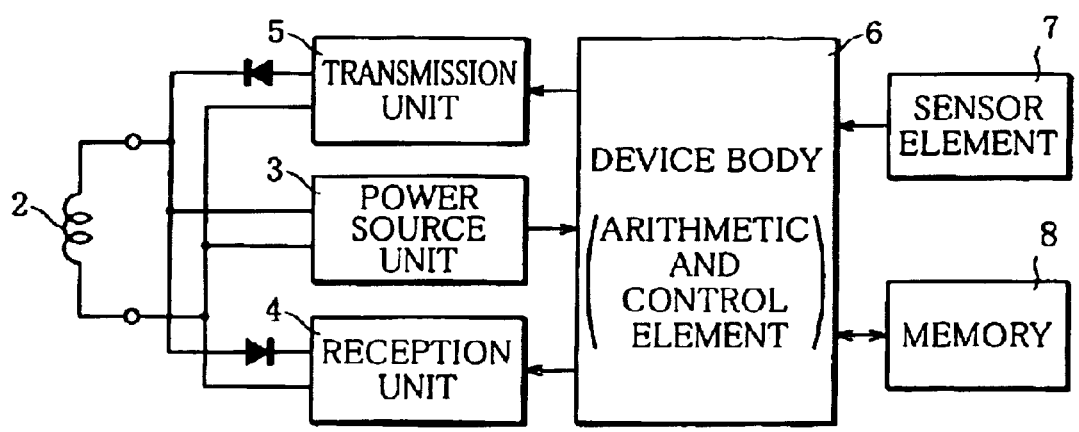
FIG. 5 is a diagram schematically showing an example of the configuration of an integrated circuit attached to the ball semiconductor.

According to the power source unit of the electromagnetic-induction coupling device of the present invention, on the other hand, the power energy (AC power) supplied to the rectifier 12 is limited by means of the MOS transistor 14, so that the modulated components of the carrier signals cannot be ruined, as indicated by the rectified equivalent waveform of FIG. 3(*c*). Thus, the smoothing circuit 13 only directly smoothes the full-wave rectified output obtained from the rectifier 12, while the constant-voltage control circuit 15 only partially bypasses the power energy (AC power) by generating the gate voltage to drive the MOS transistor 14 in accordance with the smoothed internal source voltage. Accordingly, AC power with a directly suppressed amplitude is applied between AC input terminals of the rectifier 12. Thus, in the wave detector 21 for use as the data reception unit, the modulated components, which are represented as changes of the amplitude level (thick line F), as shown in FIG. 3(*d*), can be securely detected by subjecting the AC power to full-wave rectification, for example.

If the gate of the MOS transistor 14 is controlled in like manner by the use of the load switch circuit 24 as the data transmission unit, it cannot be influenced by the Zener diode 3*b* in the conventional circuit shown in FIG. 6. Therefore, the carrier signals that carry the power energy and are received through the coil 11 can be securely modulated by equivalently changing the electric properties (Q) of the coil 11. Further, the information communication can be securely executed by changing the electric properties of the coil (antenna) on the external apparatus side that is electromagnetically coupled by means of the coil 11.

Thus, according to the electromagnetic-induction coupling device of the present invention, a fixed internal source voltage can be obtained with stability by limiting the AC power applied to the rectifier without ruining the information represented by the modulated components if the information signals are modulated for data communication with use of the electromagnetic waves for power transmission as carriers.

The present invention is not limited to the embodiment described above. For example, the MOS transistor 14 that is connected in parallel with the coil 11 and used for power (voltage) adjustment may be of the p- or n-channel type. The voltage applied to the gate of the MOS transistor 14 may be settled depending on the necessary internal source voltage. In the example described herein, the power energy based on electromagnetic waves is modulated, and the information signals are transmitted from the external apparatus to the ball semiconductor. However, the ball semiconductor may be constructed so that it can execute a predetermined operation when it receives electric power in an unmodulated magnetic field environment. In this case, the wave detector 21 and the like shown in FIG. 2 are unnecessary. In this arrangement, the information signals can be transmitted from the ball semiconductor device side to the external apparatus by controlling the operation of the MOS transistor 14 to modulate the aforesaid unmodulated magnetic field environment.

In short, the present invention is characterized in that the MOS transistor that regulates the AC voltage of the rectifier is provided on the AC input end side of the rectifier, and various modifications may be affected therein without departing from its scope or spirit.

INDUSTRIAL APPLICABILITY

In rectifying power energy supplied by electromagnetic-induction coupling by means of a coil and forming a fixed internal power source, according to the present invention, AC power applied to a rectifier is limited by means of an MOS transistor that is connected in parallel with the coil, so that the stable internal power source can be formed easily and effectively. Since a power source unit can be constructed compactly, there is an advantage that a semiconductor function element including the power source unit can be suitably realized in the case of a ball semiconductor that has a limited element region (area). Also in the case where information signals are modulated for data communication with use of electromagnetic waves for power energy transmission as carriers, a good effect can be obtained such that the internal power source can be formed with reliability without retarding the data communication.

In the MOS transistor that is connected in parallel with the coil, moreover, a surplus of the power energy obtained through the coil is bypassed by means of the MOS transistor that is connected in parallel with the coil, so that the power capacity of a rectifier element that constitutes the rectifier can be reduced to ensure miniaturization corresponding to the power capacity required by its internal circuit.

What is claimed is:

1. An electromagnetic-induction coupling device comprising:
    a coil (11) coupled to a magnetic field having power energy by electromagnetic induction;
    a rectifier (12) for subjecting the power energy fetched by means of the coil to full-wave rectification;
    a smoothing circuit (13) for smoothing a rectified output from the rectifier and forming a fixed internal power source;
    an MOS transistor (14) having a source and a drain connected in parallel across the coil; and
    a constant-voltage control circuit (15) adapted to be actuated to control the gate voltage of the MOS transistor in response to the output of the smoothing circuit, thereby limiting voltage applied to the rectifier.

2. An electromagnetic-induction coupling device comprising:
    a coil (11) coupled to a magnetic field having power energy by electromagnetic induction;
    a rectifier (12) for subjecting the power energy fetched by means of the coil to full-wave rectification;
    a smoothing circuit (13) for smoothing a rectified output from the rectifier and forming a fixed internal power source;
    an MOS transistor (14) having a source and a drain connected in parallel across the coil;
    a constant voltage control circuit (15) adapted to be actuated to control the gate voltage of the MOS transistor in response to the output of thee smoothing circuit, thereby limiting voltage applied to the rectifier;
    a data reception unit (21) for detecting a modulated component of the power energy fetched by means of the coil and receiving an information signal represented by the modulated component; and
    a data transmission unit (24) for controlling the gate voltage of the MOS transistor in response to transmission information, changing the extent of electromagnetic-induction coupling to the magnetic field of the coil, and transmitting the transmission information.

3. An electromagnetic-induction coupling device according to claim 1, wherein said rectifier is constructed by bridge-connecting four MOS transistors as rectifier elements and is integrated concurrently with the MOS transistors connected in parallel with the coil on a given semiconductor.

4. An electromagnetic-induction coupling device according to claim 3, wherein said given semiconductor is formed of a ball semiconductor having the coil on the surface thereof.

5. An electromagnetic-induction coupling device according to claim 2, wherein said rectifier is constructed by bridge-connecting four MOS transistors as rectifier elements and is integrated concurrently with the MOS transistors connected in parallel with the coil on a given semiconductor.

* * * * *